United States Patent
Galland et al.

(10) Patent No.: US 7,468,144 B2
(45) Date of Patent: *Dec. 23, 2008

(54) UV- OR HEAT TRIGGERED LOW OXYGEN PACKAGING SYSTEM EMPLOYING AN OXIDIZABLE POLYMER RESIN AND A PEROXIDE

(75) Inventors: M. Stephen Galland, Kingwood, TX (US); Gary D. Jerdee, Orange, TX (US); Gunnar Rysstad, Oslo (NO); Keith Johnstone, Cambridge (GB)

(73) Assignee: Cryovac, Inc., Duncan, SC (US)

(*) Notice: Subject to any disclaimer, the term of this patent is extended or adjusted under 35 U.S.C. 154(b) by 601 days.

This patent is subject to a terminal disclaimer.

(21) Appl. No.: 10/988,796

(22) Filed: Nov. 15, 2004

(65) Prior Publication Data
US 2005/0092963 A1    May 5, 2005

Related U.S. Application Data

(63) Continuation of application No. 09/748,529, filed on Dec. 22, 2000, now Pat. No. 6,818,150.

(51) Int. Cl.
C09K 15/04   (2006.01)
B32B 27/16   (2006.01)
B29D 22/00   (2006.01)
C02F 1/70    (2006.01)

(52) U.S. Cl. ............. 252/188.28; 428/34.2; 428/34.3; 428/35.4; 426/392; 426/397; 426/398; 426/399

(58) Field of Classification Search .......... 252/188.28
See application file for complete search history.

(56) References Cited

U.S. PATENT DOCUMENTS

| | | | |
|---|---|---|---|
| 3,497,571 A | 2/1970 | Tellier et al. ............. 260/844 |
| 3,536,687 A | 10/1970 | Nordstrom ............... 260/89.5 |
| 4,415,710 A | 11/1983 | Barnabeo et al. .......... 525/370 |
| 4,524,201 A | 6/1985 | Barnabeo et al. .......... 528/395 |
| 5,034,235 A | 7/1991 | Dunn et al. .............. 426/238 |
| 5,116,916 A | 5/1992 | Young ..................... 525/350 |
| 5,211,875 A | 5/1993 | Speer et al. ........... 252/188.28 |
| 5,346,644 A | 9/1994 | Speer et al. ........... 252/188.28 |
| 5,346,697 A | 9/1994 | Tokuyama et al. |
| 5,425,896 A | 6/1995 | Speer et al. ........... 252/188.28 |
| 5,425,953 A | 6/1995 | Sintov et al. |
| 5,466,756 A | 11/1995 | Roach et al. ............ 525/330.6 |
| 5,498,364 A | 3/1996 | Speer et al. ........... 252/188.28 |
| 5,627,239 A | 5/1997 | Ching et al. ............ 525/330.6 |
| 5,641,825 A | 6/1997 | Bacskai et al. ........... 524/398 |
| 5,656,692 A | 8/1997 | Hayes ...................... 525/63 |
| 5,660,761 A | 8/1997 | Katsumoto et al. ...... 252/188.28 |
| 5,700,554 A | 12/1997 | Speer et al. ............... 428/220 |
| 5,736,616 A | 4/1998 | Ching et al. ............ 525/330.3 |
| 5,776,361 A | 7/1998 | Katsumoto et al. ...... 252/188.28 |
| 5,814,304 A | 9/1998 | Wong et al. |
| 5,820,852 A | 10/1998 | Burgess et al. |
| 5,837,158 A | 11/1998 | Shepodd et al. ......... 252/181.6 |
| 5,851,514 A | 12/1998 | Hassan et al. |
| 5,859,145 A | 1/1999 | Ching et al. ............ 525/330.6 |
| 5,904,960 A | 5/1999 | Becraft et al. |
| 5,906,811 A | 5/1999 | Hersh |
| 5,911,910 A | 6/1999 | Becraft et al. ......... 252/188.28 |
| 6,057,013 A | 5/2000 | Ching et al. ............. 428/35.7 |
| 6,063,307 A | 5/2000 | Shepodd et al. ......... 252/181.6 |
| 6,228,347 B1 | 5/2001 | Hersh |
| 6,259,107 B1 | 7/2001 | Becraft et al. |
| 6,287,653 B1 | 9/2001 | Speer et al. |
| 6,333,087 B1 | 12/2001 | Jerdee et al. |
| 6,406,644 B2 | 6/2002 | Jerdee et al. |
| 6,491,896 B1 | 12/2002 | Rajaiah et al. |
| 6,517,776 B1 * | 2/2003 | Rodgers et al. ............. 422/24 |
| 6,527,976 B1 | 3/2003 | Cai et al. |
| 6,569,408 B1 | 5/2003 | Yue et al. |
| 6,689,314 B2 | 2/2004 | Bushman et al. |
| 2002/0017310 A1 | 2/2002 | Gruenbacher et al. |
| 2002/0137728 A1 | 9/2002 | Montgomery |
| 2003/0082113 A1 | 5/2003 | Rajaiah et al. |

(Continued)

FOREIGN PATENT DOCUMENTS

EP    1020363 A2    7/2000

(Continued)

OTHER PUBLICATIONS

PCT/US01/44239 International Preliminary Examination Report (May 9, 2003).

(Continued)

*Primary Examiner*—Joseph D Anthony
(74) *Attorney, Agent, or Firm*—Mark B. Quatt

(57) ABSTRACT

Disclosed herein is a method of initiating oxygen scavenging in a packaging article comprising an oxygen scavenging polymer. The method involves (i) providing the packaging article comprising the oxygen scavenging polymer, wherein the packaging article comprises an interior surface and an exterior surface; (ii) wetting the interior surface of the packaging article with a solution comprising a peroxide, to result in a packaging article with a wetted surface; and (iii) exposing the wetted surface to an initiating factor, to initiate oxygen scavenging by the packaging article. Typically, the initiating factor is ultraviolet light, heat, or both.

27 Claims, No Drawings

U.S. PATENT DOCUMENTS

| | | |
|---|---|---|
| 2003/0092596 A1 | 5/2003 | Veerman et al. |
| 2003/0211050 A1 | 11/2003 | Majeti et al. |
| 2004/0037789 A1 | 2/2004 | Moneuze et al. |
| 2004/0062798 A1 | 4/2004 | Lukenbach et al. |
| 2004/0081584 A1 | 4/2004 | Dayrit et al. |
| 2004/0099840 A1* | 5/2004 | Horsham et al. ....... 252/188.28 |
| 2004/0258723 A1 | 12/2004 | Singh et al. |
| 2005/0092963 A1* | 5/2005 | Galland et al. ......... 252/188.28 |
| 2005/0244665 A1 | 11/2005 | Rivett et al. |
| 2006/0276368 A1* | 12/2006 | Speer et al. ................. 510/392 |

FOREIGN PATENT DOCUMENTS

| | | |
|---|---|---|
| WO | WO98/05703 | 2/1998 |
| WO | WO99/48963 | 9/1999 |

OTHER PUBLICATIONS

Ching et al., "Tasteless Oxygen Scavenging Polymers: A New Platform Technology for Food Packaging Based on Controlled Oxidation," *Oxygen Absorber . . . 2001 and Beyond*, OSP Conference, pp. 1-8 (Chicago, Jun. 19-20, 2000).

Ching et al., "Tasteless Oxygen Scavenging Polymers: A New Platform Technology for Food Packaging Based on Controlled Oxidation," *Oxygen Absorber . . . 2001 and Beyond*, OSP Conference Slides (Chicago, Jun. 19-20, 2000).

Rule 1.111 amendment mailed Jun. 25, 2008 (relating to U.S. App. No. 11/146,848, filed Jun. 7, 2005) (12 pages).

Rule 1.111 amendment mailed Sep. 26, 2003 (relating to U.S. App. No. 09/748,529, filed Dec 22, 2000) (9 pages).

Rule 1.111 amendment mailed Apr. 6, 2004 (relating to U.S. Appl. No. 09/748,529, filed Dec. 22, 2000 (10 pages).

* cited by examiner

US 7,468,144 B2

UV- OR HEAT TRIGGERED LOW OXYGEN PACKAGING SYSTEM EMPLOYING AN OXIDIZABLE POLYMER RESIN AND A PEROXIDE

This application is a continuation application of U.S. application Ser. No. 09/748,529, filed Dec. 22, 2000, now issued as U.S. Pat. No. 6,818,150.

BACKGROUND OF THE INVENTION

1. Field of the Invention

The present invention relates generally to the field of oxygen scavenging packaging articles. More particularly, it concerns oxygen scavenging packaging articles wherein oxygen scavenging is initiated by exposure of the packaging article to a peroxide and subsequently an initiating factor, such as heat or ultraviolet light.

2. Description of Related Art

It is well known that limiting the exposure of oxygen-sensitive products to oxygen maintains the quality and extends the shelf-life of the product. For instance, by limiting the oxygen exposure of oxygen sensitive food products in a packaging system, the quality of the food product is maintained, and food spoilage is avoided. Such packaging keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging.

Another, more recent, means for limiting oxygen exposure involves incorporating an oxygen scavenger into the packaging structure. Incorporation of a scavenger in the package can scavenge oxygen present in the package upon filling with a product. In addition, such incorporation can provide a means of intercepting and scavenging oxygen as it passes through the walls of the package (herein referred to as an "active oxygen barrier"), before the oxygen could reach the packaged product, thus providing even more protection to the packaged product.

In many cases, however, the onset of oxygen scavenging in this system may not occur for days or weeks. The delay before the onset of useful oxygen scavenging is hereinafter referred to as the induction period. Much work has been done to minimize the induction period. Primarily, this work has initiated oxygen scavenging by exposure of the oxygen scavenging packaging article to radiation, especially ultraviolet light (UV) radiation, although other actinic radiation or heat may also be used as an initiating factor.

Typically, the oxygen scavenging packaging article comprises a photoinitiator. Exposure of the packaging article to UV radiation activates the photoinitiator, which presumably depletes any antioxidant present in the packaging article or otherwise allows oxygen to irreversibly react with the oxygen scavenging material.

However, even with the use of a photoinitiator, the induction period is often longer than desired, due to the time required to build up a significant level of free radicals to effectively scavenge oxygen in the package.

Therefore, a need exists for reducing the induction period after triggering by UV, heat, actinic radiation, or another initiating factor or combination of factors.

SUMMARY OF THE INVENTION

In one embodiment, the present invention is directed to a method of initiating oxygen scavenging in a packaging article comprising an oxygen scavenging polymer, comprising (i) providing the packaging article comprising the oxygen scavenging polymer, wherein the packaging article comprises an interior surface and an exterior surface; (ii) wetting the interior surface of the packaging article with a solution comprising a peroxide, to result in a packaging article with a surface wetted with the peroxide; and (iii) exposing the surface wetted with the peroxide to an initiating factor, to initiate oxygen scavenging by the packaging article. Preferably, the initiating factor is ultraviolet light or heat. Also preferably, between wetting and exposing is performed a drying step, in which the solvent component of the solution is removed from the wetted surface.

The packaging article can also comprise additives known to be useful in oxygen scavenging packaging articles, such as a transition metal catalyst, a photoinitiator, an antioxidant, and structural polymers, among others. The packaging article can be a single-layer or multilayer packaging article, and the additional layers in the multilayer packaging article can comprise an oxygen barrier layer, an oxygen permeable layer, a structural layer, or an adhesive layer, among others.

The method has the advantages of being able to initiate oxygen scavenging by a packaging article comprising an oxygen scavenging polymer and a photoinitiator more rapidly than that initiated by methods previously known. In addition, the use of a peroxide solution and exposure to ultraviolet light or heat, or both, among other initiating factors, will also tend to sterilize the surface of the packaging article to which they are applied.

DESCRIPTION OF ILLUSTRATIVE EMBODIMENTS

In one embodiment, the present invention is directed to a method of initiating oxygen scavenging by a packaging article comprising an oxygen scavenging polymer through the use of ultraviolet (UV) light or heat.

The oxygen scavenging polymer is typically a component of an oxygen scavenging layer of the packaging article. An oxygen scavenging layer can comprise other additives, such as a structural polymer, a transition metal catalyst, a photoinitiator, an antioxidant, and others known to one of ordinary skill in the art or described below.

Packaging articles typically come in several forms including rigid containers, flexible bags, combinations of both, etc. Typical rigid or semirigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material. The oxygen scavenging layer can also be a component of packaging which has non-integral oxygen-scavenging components or layers, e.g., coatings, bottle cap liners, adhesive or non-adhesive sheet inserts, gaskets, sealants or fibrous mat inserts.

The packaging article comprising the oxygen scavenging layer can be used to package any product for which it is desirable to inhibit oxygen damage during storage, e.g. food, beverage, pharmaceuticals, medical products, cosmetics, corrodible metals, or electronic devices. A packaging article according to this invention is especially useful in packaging a product for which it is desired to sterilize or substantially sterilize the packaging article before filling, e.g. if the product is a food, a beverage, or a pharmaceutical.

The packaging article comprising the oxygen scavenging layer can comprise a single oxygen scavenging layer or a scavenging layer and additional layers. Single layered packaging articles can be prepared by solvent casting or by extrusion. Packaging articles with multiple layers are typically prepared using coextrusion, coating, or lamination.

The additional layers of a multilayer material may comprise at least one oxygen barrier layer, i.e. a layer having an oxygen transmission rate equal to or less than 500 cubic centimeters per square meter ($cc/m^2$) per day per atmosphere at room temperature (about 25° C.). Typical oxygen barriers comprise poly(ethylene vinylalcohol), polyacrylonitrile, polyvinyl chloride, poly(vinylidene dichloride), polyethylene terephthalate, silica, polyamides, aluminum foil, or mixtures thereof.

The additional layers of a multilayer material may comprise at least one structural layer, i.e. a layer imparting strength, rigidity, or other structural properties to the material. The structural layer can comprise polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, ethylene-(meth)acrylic acid ionomer, or paperboard. PET or paperboard are preferred.

Other additional layers of the packaging article may include one or more layers which are permeable to oxygen. In one packaging article, preferred for flexible packaging of food, the layers include, in order starting from the outside of the package to the innermost layer of the package, (i) a structural, moisture-barrier layer, (ii) an oxygen barrier layer, (iii) an oxygen scavenging layer, and optionally, (iv) an oxygen-permeable food-contact layer. Control of the oxygen barrier property of (ii) allows regulation of the scavenging life of the package by limiting the rate of oxygen entry to the scavenging layer (iii), and thus slows the consumption of oxygen scavenging capacity. Control of the oxygen permeability of layer (iv) allows setting an upper limit on the rate of oxygen scavenging for the overall structure independent of the composition of the scavenging component (iii). This can extend the handling lifetime of the oxygen scavenging layer in the presence of air prior to sealing of the package. Furthermore, layer (iv) can provide a barrier to migration of the components of the scavenging layer, or by-products of scavenging, into the package interior. Even further, layer (iv) can improve the heat-sealability, clarity, or resistance to blocking of the multilayer packaging article.

Preferably, in such a multi-layer embodiment, the layer (iv) is also permeable to the peroxide, such as hydrogen peroxide (HOOH), or to hydroxide radical ($HO^+$), to allow the peroxide or hydroxide radical to enter the oxygen scavenging layer. Permeability to the peroxide or hydroxide radical can be achieved by selection of appropriate compounds to form the layer (iv), or by making the layer (iv) relatively thin.

Further additional layers, such as adhesive layers, may also be used. Compositions typically used for adhesive layers include anhydride functional polyolefins and other well-known adhesive layers.

The oxygen scavenging layer comprises an oxygen scavenging polymer. The oxygen scavenging polymer is a hydrocarbon with a polymeric backbone. The hydrocarbon can be saturated or unsaturated, and substituted or unsubstituted. Examples of such hydrocarbons include, but are not limited to, diene polymers such as polyisoprene, polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Examples of substituted hydrocarbons include, but are not limited to, those with oxygen-containing moieties, such as esters, carboxylic acids, aldehydes, ethers, ketones, alcohols, peroxides, or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Exemplary oxygen scavenging polymers include those described by Ching et al., International Patent Publication WO99/48963.

Preferably, the oxygen scavenging polymer comprises a polymeric backbone and at least one cyclic olefinic pendant group.

More preferably, the polymeric backbone is ethylenic. The polymeric backbone can comprise monomers of ethylene or styrene.

More preferably, the polymer further comprises a linking group linking the backbone with the pendant groups, wherein the linking group is selected from:

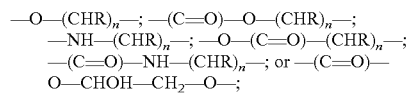

wherein R is hydrogen, methyl, ethyl, propyl, or butyl; and n is an integer from 1 to 12, inclusive.

More preferably, the cyclic olefinic pendant group has the structure (I):

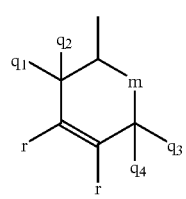

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

A most preferred oxygen scavenging polymer is ethylene/methyl acrylate/cyclohexenyl methyl acrylate terpolymer (EMCM). EMCM can be readily made following the teachings of copending U.S. patent application Ser. No. 09/127, 316, incorporated herein by reference.

The oxygen scavenging layer may also comprise a mixture of two or more oxygen scavenging polymers as described above.

The amount of oxygen scavenging polymer may range from 1 to 99%, preferably from 10 to 99%, by weight of the oxygen scavenging layer.

The oxygen scavenging layer can also comprise film-forming structural polymers. Such polymers are thermoplastic and render the oxygen scavenging layer more adaptable for use in a packaging article. Suitable structural polymers include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid and ethylene-(meth)acrylic acid ionomers. In rigid articles, such as beverage containers, PET is often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer which is incompatible with the oxygen scavenging polymer.

When one or more structural polymers are used, those polymers can comprise, in total, as much as 99% by weight of the oxygen scavenging layer.

The composition can also comprise additives known to be useful in oxygen scavenging compositions, such as a transition metal catalyst, a photoinitiator, and an antioxidant, among others.

Preferably, the oxygen scavenging compositions, oxygen scavenging layer, or the packaging article comprising the oxygen scavenging layer, comprises a transition metal catalyst. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, stearate, palmitate, 2-ethylhexanoate, neodecanoate or naphthenate. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt 2-ethylhexanoate, cobalt oleate, cobalt stearate, and cobalt neodecanoate. The metal salt may also be an ionomer, in which case a polymeric counterion is employed. Such ionomers are well known in the art.

Typically, the amount of transition metal catalyst may range from 0.001 to 1% (10 to 10,000 ppm) of the oxygen scavenging layer, based on the metal content only (excluding ligands, counterions, etc.). The transition metal catalyst can be formed in the oxygen scavenging layer or in a layer adjacent to the oxygen scavenging layer. In the event the transition metal catalyst is formed in the oxygen scavenging layer and the amount of transition metal catalyst is less than 1%, it follows that the oxygen scavenging polymer, the peroxide (if formed in the oxygen scavenging layer), and any structural polymer or additives, will comprise substantially all of the oxygen scavenging layer, i.e. more than 99% as indicated above for the oxygen scavenging polymer.

Antioxidants may be used with this invention to provide shelf-life stability or process stability, or to control scavenging initiation. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging. When it is desired to commence oxygen scavenging by a packaging article comprising the oxygen scavenging layer, the packaging article can be exposed to heat or UV.

Antioxidants such as 2,6-di(t-butyl)-4-methylphenol (BHT), 2,2'-methylene-bis(6-t-butyl-p-cresol), triphenylphosphite, tris-(nonylphenyl)phosphite and dilaurylthiodipropionate are suitable for use in the oxygen scavenging composition or layer of this invention.

The amount of an antioxidant which may be present may also have an effect on oxygen scavenging. As mentioned earlier, such materials are usually present in oxygen scavenging polymers or structural polymers to prevent oxidation or gelation of the polymers. Typically, they are present in about 0.01 to 1% by weight of the oxygen scavenging layer.

The composition can, preferably, comprise a photoinitiator. If use of a photoinitiator is desired, appropriate photoinitiators include benzophenone derivatives containing at least two benzophenone moieties, as described in copending U.S. patent application Ser. No. 08/857,325, filed May 16, 1997. These compounds act as effective photoinitiators to initiate oxygen scavenging activity in oxygen scavenging compositions. Because of their large size and low solubility, such benzophenone derivatives have a very low degree of extraction from oxygen scavenging compositions, which may lead to reduced contamination of a packaged product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

wherein X is a bridging group selected from sulfur; oxygen; carbonyl; —SiR$_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms, preferably from 1 to 40 carbon atoms; m is an integer from 0 to 11; Y is a substituted or unsubstituted benzophenone group; and n is an integer from 2 to 12.

X can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of Y, herein R", when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

The amount of photoinitiator in the oxygen scavenging composition or oxygen scavenging layer, when used, will be in the range of about 0.01% to about 10%, preferably about 0.01% to about 1%, by weight of the oxygen scavenging layer.

Other additives which can be included in the oxygen scavenging composition or oxygen scavenging layer include, but are not necessarily limited to, fillers, pigments, dyestuffs, stabilizers, processing aids, plasticizers, fire retardants, and anti-fog agents, among others.

Any further additives employed normally will not comprise more than 10% of the oxygen scavenging layer, with preferable amounts being less than 5% by weight of the oxygen scavenging layer.

The amounts of the components used in the oxygen scavenging layers or packaging articles have an effect on the effectiveness of oxygen scavenging. Thus, the amounts of oxygen scavenging polymer, transition metal catalyst, and any photoinitiator, antioxidant, structural polymers, and additives, can vary depending on the article and its end use.

For instance, the primary function of an oxygen scavenging polymer in the oxygen scavenging layer is to react irreversibly with oxygen during the scavenging process, while the primary function of the transition metal catalyst is to facilitate this process. Thus, to a large extent, the amount of oxygen scavenging polymer will affect the oxygen capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

Preferably, the packaging article is a multilayer article, more preferably a shaped container, such as a bottle comprising a PET structural layer, or a gable-top carton, such as a carton comprising paperboard. In both preferred embodiments, the oxygen scavenging layer can be formed as a coating or lamination on what is or will be formed into the interior surface, such as the interior surface of the bottle or the surface of the unfolded carton that will be folded into the interior surface of the carton. Alternatively, the oxygen scavenging layer can be formed with at least one oxygen- and peroxide- or hydroxide radical-permeable layer (a "food contact layer") between the oxygen scavenging layer and the interior of the packaging article (i.e. forming the interior surface of the packaging article). Preferably, the food contact layer comprises low density polyethylene (LDPE), and is preferably less than about 1 mil in thickness.

The present invention relates to a method of initiating oxygen scavenging in an oxygen scavenging packaging article as described above. The method comprises (i) providing a packaging article comprising an oxygen scavenging polymer, wherein the packaging article comprises an interior surface and an exterior surface; (ii) wetting the interior surface of the packaging article with a solution comprising a peroxide, to result in a packaging article with a surface wetted with the peroxide; and (iii) exposing the surface wetted with the peroxide to an initiating factor, to initiate oxygen scavenging by the packaging article.

The packaging article and the oxygen scavenging polymer are as described above. By "interior surface" of the packaging article is meant a surface that, when the packaging article is filled with a product, is partially or wholly in contact with the product. If the packaging article is a gable-top carton, a film, or another structure that is folded or otherwise shaped into the form in which it can package a product, the surface of the unfolded or unshaped structure that will become the surface partially or wholly in contact with the product is the interior surface. The "exterior surface" is a surface partially or wholly in contact with the environment, or the surface of an unfolded or unshaped structure that will enter into such contact.

The wetting step involves the application of a solution of the peroxide onto the interior surface of the packaging article. "Wetting," as used herein, refers to any method of wetting the surface with the solution. A surface on which wetting has been performed will be referred to as "wetted." Typically, wetting involves spraying the solution through a spray nozzle to form a mist that will uniformly wet the surface. This provides uniform distribution of a sufficiently high density of the solution onto the surface, and can be performed quickly and conveniently during processing on an assembly line. However, other techniques of wetting the surface will be apparent, such as applying the solution to the surface by use of a roller, or immersing the packaging article in a bath of the solution.

The solution is typically an aqueous solution comprising a peroxide. A preferred peroxide is hydrogen peroxide. However, any compound capable of generating hydroxide radicals in aqueous solution can be used. Other additives can be included in the solution, provided they do not interfere with either the ability of the peroxide to initiate oxygen scavenging, or the functional parameters (oxygen scavenging, strength, etc.) of the packaging article.

In one embodiment, the solution comprises at least about 0.5% peroxide. In another embodiment, the solution comprises at least about 30% peroxide.

After the surface of the packaging article has been wetted with the solution, it is preferred that the method further comprises a drying step, wherein water is removed from the solution on the interior surface of the packaging article, such as by evaporation under warm air. Such a surface from which water or other solvent has been removed but the peroxide has not is within the scope of "wetted" as defined above.

After the drying step, if any, oxygen scavenging can be initiated by exposing the surface to an initiating factor. Even if drying does not occur, the efficiency of initiation may depend to some extent on the interval between wetting the surface and subsequent exposure to the initiating agent. Optimizing the efficiency of initiation by altering the interval is within the scope of routine experimentation by one of ordinary skill in the art.

Though not to be bound by theory, it is believed that the peroxide or a hydroxide radical derived therefrom will penetrate the packaging article and may impregnate the oxygen scavenging layer. The initiating factor is believed to function by breaking the peroxide which has impregnated the oxygen scavenging layer down into hydroxide radicals, which may then have one or more of the following fates: consumption of any antioxidants present in the packaging article in proximity to the oxygen scavenging layer, transfer of electrons to or from the transition metal oxidation catalyst, attack on the oxygen scavenging polymer directly to bring it into a state that reacts readily with oxygen, among others, or a combination of these or other fates. Regardless of the mechanism, after initiation, oxygen can readily react with the oxidizable moieties of the oxygen scavenging polymer.

In one embodiment, the initiating factor is ultraviolet (UV) light. "Ultraviolet light" or "UV" as used herein refers to electromagnetic radiation with a wavelength between about 200 nm and about 400 nm. The ultraviolet light can be provided from any convenient source, typically a lamp, at any wavelength within the UV range. A preferred wavelength range is from about 254 nm to about 400 run. A wavelength that can be used is about 254 nm. The intensity and exposure duration of the UV are selected so as to provide a sufficiently large dosage of energy to the wetted surface of the packaging article to initiate oxygen scavenging. The dosage of UV required will vary depending on the concentration and amount of peroxide solution present on the wetted surface, the packaging article, the oxygen scavenging polymer, the presence and quantity of transition metal salts, antioxidants, and other additives in the packaging article, and other parameters apparent to one of ordinary skill in the art. Typically, the dosage of UV is at least about 100 mJ/cm$^2$, preferably at least about 800 mJ/cm$^2$, more preferably at least about 1500 mJ/cm$^2$. These dosages of UV will be sufficient to initiate oxygen scavenging by most oxygen scavenging packaging articles at most wavelengths of UV at exposures of no more than about 60 sec, and are effective at any concentration of the peroxide wetted onto the surface of the packaging article.

In another embodiment, the initiating factor is heat. Heat is effective at initiating oxygen scavenging at high concentrations of the peroxide wetted onto the surface of the packaging article, such as when the solution comprises at least about 30% peroxide. The temperature of the heating apparatus and the duration of exposure will vary depending on the packaging article, the oxygen scavenging polymer, the presence and quantity of transition metal salts, antioxidants, and other additives in the packaging article, the design of the heating apparatus, the proximity of the wetted packaging article to the heat source, the nature of heat transfer (typically convection), and other parameters apparent to one of ordinary skill in the art. Typically, the heat source is sufficient to bring the wetted surface to a temperature of at least about 70° C., preferably for at least about 60 sec.

Other initiating factors can be used, such as visible light (with a wavelength of about 400 nm to about 700 nm) or e-beam radiation, among others that one of skill in the art will recognize can promote the breakdown of the peroxide. Also, any combination of initiating factors can be used, such as, for example, heating followed by exposure to UV, or exposure to UV followed by heating, among others.

Typically, during the initiating process, the generation of hydroxide radicals by breakdown of the peroxide by UV or heat is at a sufficiently large concentration to sterilize the treated surface of the packaging article, as well as initiate oxygen scavenging.

If the packaging article is a foldable packaging article, such as a gable-top carton, initiating can occur either before or after the packaging article is folded. In any form of the packaging article, initiating can occur by exposure of the initiating factor to either the exterior, the interior, or both surfaces. Initiating will be most effective if the initiating factor is exposed directly to the wetted surface. If the initiating factor is exposed to the wetted surface, the application of the peroxide and the initiating factor will also sterilize the wetted surface.

After initiating, the packaging article can be used normally for the packaging and storage of a product, especially a food, a beverage, or a pharmaceutical, among others. The packaging article will both store the product and consume oxygen, such as either present in the product or other interior space upon filling, or migrated into the packaging article from the environment during or after filling.

A useful oxygen scavenging rate of the oxygen scavenging layer of the packaging article can be as low as 0.05 cc $O_2$ per gram of oxygen scavenging polymer in the scavenging component per day in air at 25° C. and 1 atmosphere pressure, if providing a barrier to oxygen entry into the package (an "active barrier") is the intended use. However, certain oxygen scavenging layers, e.g. those containing oxygen scavenging polymers with a polymeric backbone, cyclic olefinic pendant groups, and linking groups linking the backbone with the pendant groups, can exhibit rates of at least about 0.5 cc $O_2$ per gram per day, and in some cases about 5.0 cc $O_2$ per gram per day, thus making such compositions suitable for scavenging oxygen from within a package, as well as suitable for active oxygen barrier applications.

When it is desired to use this method with an active oxygen barrier application, the initiated oxygen scavenging activity, in combination with any oxygen barrier layers, should create an overall oxygen transmission rate from the environment into the interior of the packaging article of less than about 1.0 cc $O_2$ per m$^2$ per day per atmosphere at 25° C. The oxygen scavenging capacity should be such that this transmission rate is not exceeded for at least four days.

For many commercial applications, it is preferable that scavenging establishes an internal oxygen level of less than 0.1% in as soon as possible, preferably less than about four weeks. See Mitsubishi Gas and Chemical Company, Inc.'s literature titled "AGELESS®"—A New Age in Food Preservation" (date unknown).

Once scavenging has been initiated, the oxygen scavenging layer, or packaging article comprising the layer, should continue to scavenge oxygen until substantially all of its oxidizable sites have been consumed. In use, the oxygen capacity (the total amount of oxygen scavenged until substantially all of the oxidizable sites are consumed) required for a given application depends on: (1) the quantity of oxygen initially present in the package, (2) the rate of oxygen entry into the package in the absence of the scavenging property, and (3) the intended shelf life for the package.

When using oxygen scavenging polymers comprising a polymeric backbone, cyclic olefinic pendant groups, and linking groups linking the backbone with the pendant groups, the oxygen capacity can be as low as 1 cc $O_2$ per g, but preferably is at least 50 cc $O_2$ per g. Preferably, the layer comprising the oxygen scavenging polymers will have an oxygen capacity of at least 250 cc $O_2$ per m$^2$ per mil thickness, and more preferably at least 1200 cc $O_2$ per m$^2$ per mil thickness.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in The art should, in light of the present disclosure, appreciate that many changes can be made in the specific embodiments which are disclosed and still obtain a like or similar result without departing from the spirit and scope of the invention.

EXAMPLE 1

Activation of Oxygen Scavenging by Hydrogen Peroxide and UV Treatment

Two identical film samples comprising an oxygen scavenging polymer were prepared. A surface of the control sample was exposed to a Heraeus NG7087 ultraviolet source with a peak wavelength of 253.7 nm for 3 sec at a distance of about 1 in (2.6 cm). The intensity of administered UV was measured by a Sola sensor to be 850 mJ/cm$^2$. The experimental sample was treated identically, except prior to UV exposure, the surface to be exposed was sprayed with an aqueous solution of 2% hydrogen peroxide and dried at 70° C.

The ability of the control and the experimental sample to consume headspace oxygen was measured by adding 160 cm$^2$ of each film to a glass bottle filled with 120 mL air (about 25 mL oxygen) and held at 23° C. Headspace oxygen was measured by gas chromatography no more than once per day for seven days.

The control removed less than about 1 mL of oxygen for the first two days. By day 5, it removed about 18 mL of oxygen, which increased to about 19 mL of oxygen by day 7. The experimental sample removed less than about 1 mL of oxygen for the first day, but by day 2 had removed about 15 mL of oxygen, up to about 18 mL by day 3.

From these results it can be concluded that hydrogen peroxide/UV treatment reduces the induction period for oxygen scavenging and does not impair either the oxygen scavenging rate or the oxygen scavenging capacity of the film, relative to the control, for the removal of headspace oxygen.

In another experiment, the ability of the experimental and control films to consume dissolved oxygen was measured. A film (160 cm$^2$) was inserted into a glass bottle filled with 210 mL air-equilibrated water (approximately 1.25 mL oxygen) at 23° C. Dissolved oxygen was measured using an Orbisphere Micro O$_2$ logger, no more than once per day for seven days.

The control removed less than about 0.15 mL oxygen the first two days. By day 5, the control had removed about 1 mL oxygen, and removed about 1.25 mL oxygen by day 7.

The experimental film, in contrast, removed about 0.6 mL oxygen the first day, and a total of about 0.8 mL oxygen by day 2. By day 5, it had removed about 1.15 mL.

These results indicate hydrogen peroxide/UV treatment reduces the induction period for oxygen scavenging and does not impair either the oxygen scavenging rate or the oxygen scavenging capacity of the film, relative to the control, for removal of dissolved oxygen.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of initiating oxygen scavenging in a packaging article comprising an oxygen scavenging polymer, comprising:
   a) providing the packaging article comprising an oxygen scavenging layer comprising the oxygen scavenging polymer, wherein the packaging article comprises an interior surface and an exterior surface;
   b) wetting the interior surface of the packaging article with an aqueous solution comprising a peroxide, to result in a packaging article with a wetted surface; and
   c) exposing the wetted surface to heat, to initiate oxygen scavenging by the packaging article;

wherein said method reduces the induction period for oxygen scavenging as compared to a method wherein the interior surface of the packaging article is not first wetted with a peroxide containing aqueous solution.

2. The method of claim 1, wherein the oxygen scavenging polymer comprises a polymeric backbone and at least one cyclic olefinic pendant group.

3. The method of claim 2, wherein the polymeric backbone is ethylenic, and the cyclic olefinic pendent group has the structure (I):

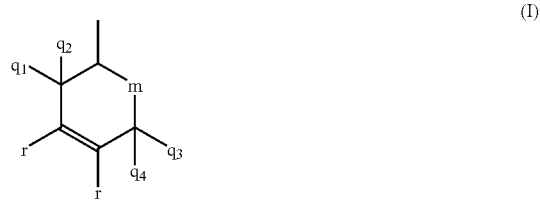

wherein q$_1$, q$_2$, q$_3$, q$_4$, and r are independently selected from hydrogen, methyl, or ethyl; m is —(CH$_2$)$_n$—, wherein n is an integer from 0 to 4, inclusive; and, when r is hydrogen, at least one of q$_1$, q$_2$, q$_3$, and q$_4$ is also hydrogen.

4. The method of claim 3, wherein the oxygen scavenging polymer is ethylene/vinyl cyclohexene copolymer (EVCH).

5. The method of claim 3, wherein the oxygen scavenging polymer further comprises at least one linking group linking the backbone with the pendant group.

6. The method of claim 5, wherein the linking group is selected from —O—(CHR)n—; —(C═O)—O—(CHR)n—; —NH—(CHR)n—; —O—(C═O)—(CHR)n—; —(C═O)—NH—(CHR)n—; or (C═O)—O—CHOH—CH2—O—;

wherein R is hydrogen, methyl, ethyl, propyl, or butyl; and n is an integer from 1 to 12, inclusive.

7. The method of claim 6, wherein the oxygen scavenging polymer is selected from ethylene/methyl acrylate/cyclohexenyl methyl acrylate terpolymer (EMCM) or cyclohexenylmethyl acrylate (CHAA) homopolymer.

8. The method of claim 1, wherein the peroxide is hydrogen peroxide.

9. The method of claim 8, wherein the solution comprises at least about 0.5% hydrogen peroxide.

10. The method of claim 9, wherein the solution comprises at least about 30% hydrogen peroxide.

11. The method of claim 1, wherein the heat is provided to bring the wetted surface to a temperature of at least about 70° C.

12. The method of claim 1, wherein the initiating factor is ultraviolet light.

13. The method of claim 1, wherein the packaging article comprises a structural layer.

14. The method of claim 13, wherein the structural layer comprises polyethylene, low density polyethylene, very low density polyethylene, ultra-low density polyethylene, high density polyethylene, polyethylene terephthalate (PET), polyvinyl chloride, ethylene-vinyl acetate copolymer, ethylene-alkyl(meth)acrylate copolymer, ethylene-(meth)acrylic acid copolymer, ethylene-(meth)acrylic acid ionomer, or paperboard.

15. The method of claim 14, wherein the structural layer comprises PET or paperboard.

16. The method of claim 14, wherein the packaging article is in the form of a bottle or a gable-top carton.

17. The method of claim 1, wherein the packaging article further comprises a transition metal catalyst.

18. The method of claim 17, wherein the transition metal catalyst is a cobalt salt, a copper salt, or a manganese salt.

19. The method of claim 18, wherein the transition metal catalyst is a cobalt salt selected from cobalt oleate, cobalt stearate, or cobalt neodecanoate.

20. The method of claim 1, wherein the packaging article comprises an oxygen barrier layer on the exterior surface and an oxygen scavenging layer that comprises the oxygen scavenging polymer.

21. The method of claim 20, wherein the wetting step comprises spraying the interior surface of the packaging article with the solution comprising the peroxide.

22. The method of claim 20, wherein the oxygen scavenging layer is a food-contact layer on the interior surface of the packaging article.

23. The method of claim 20, wherein the packaging article further comprises a food contact layer on the interior surface, and wherein the oxygen scavenging layer is located between the food contact layer and the oxygen barrier layer.

24. The method of claim 23, wherein the food contact layer comprises low density polyethylene (LDPE).

25. The method of claim 24, wherein the thickness of the food contact layer is less than about 1 mil.

26. The method of claim 20, wherein the oxygen barrier layer comprises at least one material selected from poly(ethylene vinyl alcohol), polyacrylonitrile, polyvinyl chloride, poly(vinylidene dichloride), polyethylene terephthalate (PET), silica, polyamides, aluminum foil, or mixtures thereof.

27. The method of claim 20, wherein the polymer is PET.

* * * * *